United States Patent [19]

Hobrecht

[11] 4,171,141
[45] Oct. 16, 1979

[54] VEHICLE REINFORCING BAR

[76] Inventor: Alvin J. Hobrecht, 6521 Crista Palma Dr., Huntington Beach, Calif. 92647

[21] Appl. No.: 859,050

[22] Filed: Dec. 9, 1977

[51] Int. Cl.² .......................................... B60R 27/00
[52] U.S. Cl. .................................... 280/756; 296/102
[58] Field of Search ......................... 296/102; 280/756

[56] References Cited

U.S. PATENT DOCUMENTS

| | | | |
|---|---|---|---|
| 2,805,887 | 9/1957 | Selby | 296/102 |
| 3,244,251 | 4/1966 | Duncan | 296/102 X |
| 3,622,177 | 11/1971 | Notestine et al. | 296/102 X |

*Primary Examiner*—Joseph F. Peters, Jr.
*Assistant Examiner*—Norman L. Stack, Jr.
*Attorney, Agent, or Firm*—George F. Bethel; Patience K. Bethel

[57] ABSTRACT

The following specification discloses a vehicle reinforcing bar that can be used with a pickup truck body. In particular, one of the members of the bar is a U shaped member having mounting plates upon which it stands in the bed of the pickup truck. A pair of angularly oriented bracing members is attached at its ends both to the cross member of the U shaped member and to the bed or wheel wells of the truck. The bracing members are pivotally attached to the cross member of the U shaped member by means of collars. The pivotal mounting permits free rotation of the bracing members around the cross member. This allows the entire brace to be folded into a flattened configuration for shipment until it is installed in a truck. Upon installation by attachment of the free ends of the bracing members to plates on the wheel wells, the bracing members become fixed relative to the cross members, precluding further rotation.

9 Claims, 5 Drawing Figures

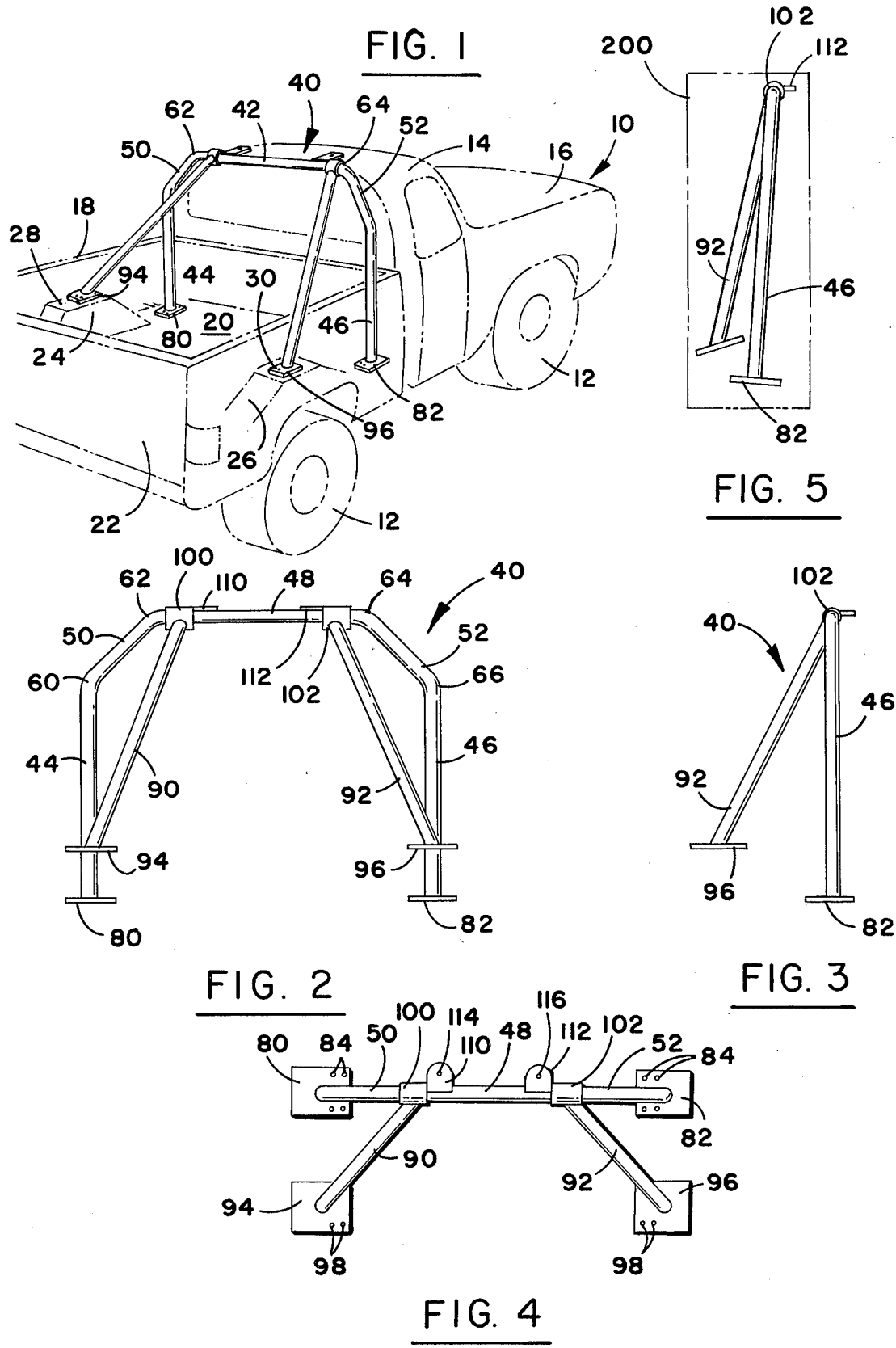

VEHICLE REINFORCING BAR

BACKGROUND OF THE INVENTION

1. Field of the Invention

The field of this invention lies within the vehicle bracing art for protection in the eventuality of an accident of some type. In particular, it provides a roll bar across the cab section of a vehicle, such as a pickup truck. In the eventuality of a roll, or weight being dropped on the cab of the truck, the roll bar protects the occupants of the vehicle.

2. The Prior Art

The prior art related to vehicle bracing and roll bar protection has incorporated various configurations. Some of these configurations have been stylistic with a multitude of configurations to conform to a vehicle's appearance.

The sole requirement for safety is that the conformation generally protects the occupants of the cab or passenger area of a vehicle. In particular, when a cab or passenger area of a truck or other vehicle is stressed, such as in a roll condition, or a weight is dropped on the cab, the thin gauge metal of the roof is not sufficient to prevent a collapse. In most cases, this results in damage to the vehicle and often serious injury to the occupants. In an effort to prevent this, the prior art has developed a number of roll bar configurations. In many cases these have been utilized for trucks and in particular, pickup trucks.

One of the configurations that has been utilized in part over the years, has incorporated a U shaped member that conforms to the general configuration of the back portion of a cab or pickup truck. These reinforcing roll bars are generally provided with angular bracing members. These bracing members usually extend from the cross portion of the U shaped roll bar to the deck or bed of the pickup truck or to the tops of the wheel wells. They are then bolted in place or configured in a manner whereby they provide a solid rigidifying frame member. The resulting rigid bar protects the truck cab in the event that the truck is rolled or a weight is dropped on top thereof.

In the manufacture of the foregoing bracing or roll bar members, it has been common to weld them in the entirety at the manufacturing facility prior to sending them out to be fitted to the truck. As can be understood, the roll bars are generally of a type and configuration that they are fitted after the truck has been manufactured by the dealer or the owner. This being the case, the shipping costs or the storage costs have been prohibitively high. One of the main reasons for this is the unwieldy shape of the welded roll bars. Considerable space in thus required for shipping and storage.

The applicant has provided a new roll bar configuration that is readily manufactured for easy shipment. In addition thereto, it can be stored in wavehouses and on display racks due to its substantially flat condition prior to installation. This flattened shape is in contrast to the angular pair of projecting members found in the prior art.

The applicant has invented the use of a movable collar member on the cross member of the roll bar for pivotal attachment to the ends of a pair of bracing members. The opposite ends of the bracing members are mounted on base plates. Upon installation, the base plates secure the cross member of the U-shaped roll bar from collapse.

This unique configuration, permitting shipment and storage of the roll bar in a substantially flattened condition, provides the applicant with substantial advantages over the existing competition as to manufacturing and transportation costs. Further advantages accrue from the overall adaptability and usage of the roll bar for trucks. This is due to the considerable variation in angle of the bracing members, allowing installation in trucks of varying size.

As a consequence, this invention has substantial advantages over the prior art. Numerous problems as to assembly, manufacture, storage and shipping of roll bars are also solved by this invention. Enhanced safety, preventing loss of life, is also obtained through the application of this invention to the vehicle world. Thus, this invention should be read broadly as to the following specification, and to the problems it solves, even though it is one of a relatively simple design and easily understood.

SUMMARY OF THE INVENTION

In summation, this invention comprises a roll bar for a vehicle, such as a pickup truck. A pair of collars on the roll bar provide the flexibility of a pair of bracing members attached thereto to pivot with respect to a U shaped support portion thereof.

In particular, the roll bar of this invention comprises a U-shaped member including a cross member and a pair of upright portions. The cross member which is preferably continuous with the upright portions of the U shaped member, serves to rigidify and brace the cab section or vehicle occupancy portion in the eventuality of a roll. Attachment of the U shaped member to a truck is provided by means of base plates on the free ends of the upright portions.

Attached to the cross member of the U shaped member are a pair of bracing members that are diagonally oriented and trail backwardly toward the wheel well section. At one of the ends of the angular bracing members are a pair of plates that serve to mount the bracing portions to a portion of the wheel wells. The other ends of the pair of bracing members terminate in a pair of sleeves or collars that surround the cross portion of the U shaped member.

In order to prevent movement of the collars inwardly, a pair of tabs or plates for mounting lights are welded to the cross member. Outward movement of the sleeves in the bracing members is precluded by an angular relationship of the U shaped member turning into the upright portions thereof.

As a consequence, the foregoing bracing members and U shaped members can be pivoted with respect to each other to form a substantial flattened configuration. Shipping and storage in this flattened condition provides economical advantages. Subsequent expansion of the roll bar from its flattened state permits size adjustment relative to truck bed size. Upon bolting of the diagonal bracing members and U shaped member to the truck body it creates a rigid bracing network for the truck. Practical as well as economical advantages are thus obtained.

BRIEF DESCRIPTION OF THE DRAWINGS

The invention will be more clearly understood by reference to the description below taken in conjunction with the accompanying drawings wherein:

FIG. 1 shows a perspective view of a phantom configuration of a pickup truck having the bracing roll bar unit of this invention mounted in the truck bed thereof;

FIG. 2 is a front elevation view of the bracing roll bar unit of this invention;

FIG. 3 is a side elevation view of the roll bar unit of this invention;

FIG. 4 is a top plan view of the roll bar unit of this invention; and,

FIG. 5 is a view of the roll bar unit of this invention shown in a collapsed or folded configuration in a box ready for shipment or storage in a facile manner which can later be extended in its diagonal relationship for installation in a truck.

DESCRIPTION OF THE PREFERRED EMBODIMENTS

Looking more particularly at FIG. 1 and the figures that are ancillary thereto, a perspective view of a truck 10 is shown. The truck 10 in the form of a pickup truck has tires 12. The pickup truck 10, as is normal in most cases, has a cab 14 and engine compartment with a hood 16 thereover.

The rear portion of the truck has an open cargo carrying portion 18 having a bed 20. At the rear thereof is a tailgate 22. Overlying the pattern of the rear wheels 12 are a pair of wheel wells 24 and 26. The wheel wells 24 and 26 generally have a flat portion, respectively 28 and 30 at the top surface thereof.

While the truck 10 is shown as a pickup truck, this invention can be used with trucks of any suitable configurations. For instance, the truck can have a closed or open cab. A closed van or other type of truck, wherein a body or bed 20 is provided with a cover portion in various configurations can also be used. The thought of the instant case is that the invention in combination with the truck 10 be utilized in protecting the cab portion 14 due to the thin metallic structure of the roof thereof.

Looking more particularly at the support member roll bar configuration of the invention, it is seen that the roll bar unit 40 is shown having a U shaped member 42. The U shaped member 42 comprises two upright portions 44 and 46 with a cross member 48. The U shaped structure also has been configured so that two angle portions 50 and 52 are provided that conform to the general configuration of the U shaped member 42.

The U shaped member 42 can be configured in any kind of upstanding configuration whereby uprights such as uprights 44 and 46 are provided. For example, a complete U bend through the portions 50 and 52 can be provided without the angle at the respective joindure areas where they meet the uprights 44 and 46 and the horizontal cross member 48. In the particular configuration shown, approximately a forty five degree angle has been included at the angles 60, 62, 64 and 66. These angles serve a function that will be expanded upon later. Suffice it to say, they determine the locking function that will be expanded upon.

The U shaped members can also be configured to various cross sections. For example, there can be employed a tubular section having a rounded circumferential cross section, a square section, an angle iron, such as an L shape, or a tubular triangular member. Thus, any tubular or channel section can be employed that will conform to the general bending and conformation required to provide an upright support member as U shaped member 42.

In this particular instance, the structure of the U shaped member 42 has been conformed out of a continuous tubular circumferential member such as a pipe, although the other channel members having various cross sections as expanded upon hereinbefore can also be used. It has been found that the bends at the angles 60, 62, 64 and 66 at a forty five degree angle are suitable for cross sectional modulus stress. At the same time, the tubular member is capable of being bent and formed in the manner as shown.

The uprights 44 and 46 of the U shaped member rest on base plates 80 and 82. The base plates 80 and 82 are configured in a manner whereby they can be bolted by means of bolt holes 84 to the base of the bed 20, as shown in FIG. 4. The bolt holes 84 can be substituted by any other suitable attachment means, such as welding, rivets, or other means. Furthermore, the base plates 80 and 82 can be eliminated if substantial strength is imparted into the bed 20 of the truck.

The U shaped member 41 is provided with angular support members 90 and 92. The two respective diagonal supports 90 and 92 have base plates 94 and 96 which rest on the flattened tops 28 and 30 of the wheel well housings 24 and 26 respectively. The base plates 94 and 96 are bolted thereto by bolts through bolt holes 98 shown in FIG. 4. As in the previous case, the bolt holes can be substituted by any other securement means as is practical.

The diagonal bracing members 90 and 92 are welded to the plates 94 and 96 at one end and to two tubular collars or sleeves, respectively 100 and 102. The sleeves 100 and 102 are normally slid over the outer circumference of the cross member 48 prior to assembly. The sleeves 100 and 102 can be implaced after assembly.

The collars 100 and 102 can be formed to any particular configuration, so long as they allow the pivotal movement that is to be described hereinafter. Nevertheless, they should be precluded from substantial movement along the length of the cross bar 48. Otherwise they will tend to collapse inwardly under any stress. Consequently, the attached diagonal braces 90 and 92 would fail to provide the strength to the cross bar 48 as required in the eventuality of a roll of the vehicle 10 or a crushing of the cab area 14.

The sleeves 100 and 102 are fundamentally allowed to rest freely on the outer circumference of the cross member 48 so that they can swing backwardly and forwardly in any kind of angular relationship therewith until they have been mounted or welded in place.

In the embodiment shown, the collars 100 and 102 are prevented from outward lateral movement by the respective angles 62 and 64. In this manner, they cannot move outwardly in a direction which is away from the center of the bar 48. In addition thereto, the tubular members 100 and 102 which swing freely around the cross member 48 are secured from inwardly lateral movement in a direction which is toward the center of bar 48 by means of blocking plates 110 and 112. Blocking plates 110 and 112 and angles 62 and 64 restrict lateral movement to a prescribed area of collars or sleeves 100 and 102 together onto attached arms 90 and 92 respectively.

The plates 110 and 112 have openings 114 and 116 therein which serve to receive a bolt from a light. In other words, a light means is mounted on the plates 110 and 112 to provide a highly elevated warning light. This warning light can augment other lighting means to provide increased safety.

The plates 110 and 112 are welded to the bar 48 by means of any suitable welds sufficient to prevent and secure the movement of the collars 100 and 102 inwardly.

In FIGS. 2, 3 and 4, the showings are of the unit 40 as it is mounted in the truck. However, in FIG. 5, the unit has been shown in a box 200 for shipping purposes. In this instance, the diagonal or angular bracing members 90 and 92 have been collapsed inwardly toward the upright portions 44 and 46. This is made possible by means of the collars 100 and 102 creating a pivotal or hinged movement on the cross bar 48. This rotary movement allows for inward folding of the unit to be stored in a box 200. In the folded condition the roll bar unit 40 can be hung up on any other device for purposes of display, storage, or later use.

As can be seen, the flattened configuration shown in FIG. 5 as compared to FIG. 3, shows a substantial difference in space requirement. By moving the angular members 90 and 92 inwardly beyond the point of the plates 80 and 82 of the upright 44 and 46, they can be stored within the interior portion of the U shaped member 48. This provides an easier storage and hanging configuration for the entire unit.

As can be seen from the foregoing configuration, the unit can be folded and shipped in an easy and facile manner. Later, it can be assembled in its braced configuration for use with the truck. As an added convenience, the support bar units 40 do not have to be welded ahead of time.

By adjustment of the angle of pivot there is provided a significant amount of leeway to accommodate many kinds of truck configurations. In other words, oftentimes the wheel well covers 24 and 26 are of a different type of elevation, size, or other location. With the diagonal bracing bars 90 and 92 and the attached sleeves 100 and 102. The members can accommodate almost any size truck. As can be appreciated, the accommodation of many sizes of trucks at different levels of wheel wells is of distinct advantage.

From the foregoing, it can be seen that this invention improves the storage, shipping, and overall versatility of the unit. This is made possible by virtue of the flexible collar connection means and general assembly thereof in a manner to accommodate various truck configurations. In addition, the invention allows for considerable shipping and storage savings due to the reduced size and overall configuration in the collapsed or folded condition.

As a consequence, this invention should be read broadly over the prior art which has only had rigidified and custom configured structures for each respective roll bar configuration of a truck.

I claim:

1. The combination of a vehicle and a reinforcing support comprising:
    a vehicle having a cab area for occupants with a bed therebehind upon which a reinforcing member can be mounted;
    a U shaped member having a cross member and uprights with mounting means attached thereto adapted to be mounted to the bed of said vehicle; and
    at least two reinforcing angular members attached to said cross member of said U shaped member by sleeves mounted on said cross member in circumferential relationship thereto with mounting means at the other end adapted to be mounted to a portion of the structure of said vehicle for purposes of holding said angular member to said structure whereby the brace said U shaped member so that upon an impact or a roll, the cross member will serve to receive the load that would normally be spread across the cab of said vehicle.

2. The combination as claimed in claim 1 further comprising:
    means for precluding the movement of said collars along the length of said cross member of said U shaped member.

3. The combination as claimed in claim 2 wherein:
    said means for preventing the movement of said sleeve along said cross member in part comprise a pair of angular bends in said U shaped member, each bend being adjacent said cross member and said upright member to prevent outward movement of said sleeves along the length of said cross member.

4. The combination as claimed in claim 3 further comprising:
    a pair of members that have been welded to the cross member of said U shaped member, each being spaced from said angular bend to prevent inward movement of said sleeves inwardly along the length of said cross member.

5. The combination as claimed in claim 4 wherein:
    said members that have been welded thereto comprise a pair of plates adapted to receive vehicle lights attached thereto.

6. A roll bar formed in a manner that can be at least partially holding said angular members to said structure whereby they brace with respect to its bracing members and provided in a manner whereby it can accommodate various height configurations of beds and wheel wells of a vehicle comprising:
    a first U shaped member having vertical upright portions and a cross member;
    a pair of rearwardly extending angular members attached to said cross member of said U shaped member to allow said angular members prior to installation to retract into close angular relationship to said uprights of said U shaped member, while allowing flexibility prior to installation of said pivotal angular relationship that is established between the U shaped member and said angular members; and,
    means for mounting said U shaped member and said angular members respectively on the bed of the truck and the wheel well coverage thereof.

7. The roll bar as claimed in claim 6 wherein said mounting means comprise:
    base plates attached to the ends of the uprights of said U shaped member; and,
    base plates attached to the ends of said angular members.

8. The roll bar as claimed in claim 7 further comprising:
    means to prevent movement laterally along the length of said cross member of said U shaped member.

9. The roll bar as claimed in claim 8 wherein said means to prevent lateral movement comprise:
    a bend in said U shaped member; and,
    welded members on said cross member interiorly of said tubular member.

* * * * *